(12) United States Patent
Johnson et al.

(10) Patent No.: US 6,723,427 B1
(45) Date of Patent: Apr. 20, 2004

(54) FADE PRINTED DECORATIVE SHEETS AND METHODS AND APPARATUS FOR MAKING THE SAME

(75) Inventors: John R. Johnson, Valparaiso, IN (US); William Buehne, Hammond, IN (US); Lee B. Devine, Valparaiso, IN (US)

(73) Assignee: Avery Dennison Corporation, Pasadena, CA (US)

( * ) Notice: Subject to any disclaimer, the term of this patent is extended or adjusted under 35 U.S.C. 154(b) by 46 days.

(21) Appl. No.: 09/598,593

(22) Filed: Jun. 21, 2000

Related U.S. Application Data
(60) Provisional application No. 60/140,332, filed on Jun. 21, 1999.

(51) Int. Cl.$^7$ ............................. B32B 15/04; C09J 7/02
(52) U.S. Cl. ..................... 428/343; 428/352; 428/354; 428/355 R; 428/353
(58) Field of Search ................. 428/343, 352, 428/353, 354, 355 R

(56) References Cited

U.S. PATENT DOCUMENTS

| | | | | |
|---|---|---|---|---|
| 4,533,704 A | * | 8/1985 | Alexander et al. ........... 525/440 |
| 4,810,540 A | | 3/1989 | Ellison et al. ................ 428/31 |
| 4,877,657 A | * | 10/1989 | Yaver .......................... 428/31 |
| 4,931,324 A | * | 6/1990 | Ellison et al. ................ 428/31 |
| 5,034,269 A | * | 7/1991 | Wheeler .................... 428/317.3 |
| 5,114,789 A | | 5/1992 | Reafler ....................... 428/328 |
| 5,192,609 A | * | 3/1993 | Carroll, Jr. .................. 428/328 |
| 5,518,786 A | | 5/1996 | Johnson et al. ............. 428/40.6 |
| 5,985,079 A | * | 11/1999 | Ellison ..................... 156/244.23 |

OTHER PUBLICATIONS

PCT/US00/17057; PCT International Search Report mailed Aug. 28, 2000.

\* cited by examiner

*Primary Examiner*—Daniel Zirker
*Assistant Examiner*—Victor S Chang
(74) *Attorney, Agent, or Firm*—Renner, Otto, Boisselle & Sklar, LLP

(57) ABSTRACT

The present invention relates to multilayer decorative sheet comprising: (a) an outer heat resistant carrier first carrier sheet, (b) a clear coat, which in one embodiment, comprises a blend of a fluorocarbon polymer and an acrylic or methacrylic resin, coated on the carrier sheet, (c) a tie coat layer on the clear coat layer, (d) fade print coat on the tie coat layer, (e) an optional back coat on the print layer, (e) a pressure-sensitive adhesive, and (f) a second carrier sheet adhered to the pressure-sensitive adhesive. When used on a vehicle the graphic has an opaque portion, such as a metallic finish, at the topside of the vehicle and the opacity fades over the graphic to clear, thereby revealing the vehicle's color under the decorative sheet. The fading occurs across the width of the graphic. In one embodiment, the fade is gradual and reveals little stark changes in opacity. The present invention provides a decorative laminate which provides a fade from one opacity to another wherein the sheet has a combination of good durability, elongation, opacity, gloss and DOI levels and a defect-free surface.

9 Claims, 1 Drawing Sheet

FADE PRINTED DECORATIVE SHEETS AND METHODS AND APPARATUS FOR MAKING THE SAME

REFERENCE TO RELATED APPLICATION

This application is a continuation of pending application Ser. No. 60/140,332, filed Jun. 21, 1999, the disclosure of which is hereby incorporated by reference in its entirety.

BACKGROUND OF THE INVENTION

This invention relates to decorative sheets which provide a change or fade in opacity across the sheet. The decorative sheets are useful in vehicles, such as automobiles, to provide detailing and customization.

FIELD OF THE INVENTION

Automotive design and manufacture present a unique set of problems in the selection of materials and processes used in the manufacture of automobile bodies. As a form of transportation, automobiles are unique because most buyers want a vehicle to have a certain individual styling. A recent trend in the automobile industry is toward production of distinctive vehicles styled to attract specific groups of consumers. This change has required the car builder to shift production from a few models manufactured in large volumes to a larger number of more distinctive body styles. These developments have demanded from the manufacturer both styling flexibility and reasonable tooling costs for each body style.

It is difficult to provide a conventional process for painting an automobile which provides a gradual and consistent fade of one color into another. Careful process controls are required to provide a fade of one color into another. Even if it was able to provide such paint, it would require a multistep process and be labor intensive. The expense would make the production unfeasible. It is desirable to have a film which provides a fade across its surface from one color to another. The sheet could be applied to the vehicle surface where the color of the sheet blends to a clear overlay, thus producing the desired fade effect.

A number of technical problems must be overcome in order to use such a film for exterior automotive applications. For instance, the film must be defect-free before being applied. The film also must initially be repositionable. Therefore, the adhesive should have a relatively low initial tack value which increases over time and therefore becomes increasingly more difficult to remove. The film must avoid long-term delamination at the adhesive interface between the film and the car body panel; and inter-layer delamination between the various coatings in the finished composite film also must be avoided.

Durability properties are also critical in producing a paint coat capable of exterior automotive use. The paint coat must avoid exhibiting defects when exposed to mechanical impact and avoid deterioration of the surface from exposure to chemicals and to the weather. Among other properties, the film requires good cleanability, UV and heat resistance.

A paint system that produces the toughness or hardness necessary for exterior automotive use also must have the elongation properties necessary for applying the film around complex three-dimensional shapes without cracking, or producing stress lines or other surface non-uniformities. Certain paint films having good elongation at elevated temperatures are not necessarily applicable to the present invention which requires good elongation at room temperatures.

Thus, the desired paint system should have a critical combination of many physical properties in order to produce a surface capable of exterior automotive use, while retaining the desired surface characteristics after the application process. However, some physical properties tend to be mutually incompatible in such a process. For instance, a paint system may have good durability properties such as hardness, toughness, weatherability and the like; but the same paint system may not have sufficient room temperature elongation to be applied smoothly over a complex shape by a pressure-sensitive adhesive. Some paint systems have sufficient elongation to permit application over a complex shape, but they are too soft and therefore lacking in the necessary hardness and/or durability properties.

U.S. Pat. No. 5,518,786 relates to an exterior automotive laminate with pressure-sensitive adhesive. The patent relates to a flexible decorative sheet for use in surfacing an automotive body panel which includes a first polyester carrier sheet having a high gloss surface, a clear coat of a weatherable optically clear polymer containing fluorocarbon resin and acrylic resin coated on the surface of the first carrier sheet, a tie coat on the clear coat, and a color coat containing a chlorinated polymer with dispersed pigments cast on the tie coat and dried. A pressure-sensitive adhesive is formed on a second polyester carrier sheet and then laminated to the exposed face of the color coat to form a pressure-sensitive adhesive-backed composite paint coat between the outer carrier sheets which form protective removable backing sheets for the resulting laminate.

It is desirable to have a decorative sheet which provides the ability to fade from one color to another, i.e., having an opacity change over surface which is durable and has the acceptable appearance properties for exterior automotive use.

SUMMARY OF THE INVENTION

The present invention relates to multilayer decorative sheet comprising: (a) an. outer heat resistant carrier first carrier sheet, (b) a clear coat, which in one embodiment, comprises a blend of a fluorocarbon polymer and an acrylic or methacrylic resin, coated on the carrier sheet, (c) a tie coat layer on the clear coat layer, (d) fade print coat on the tie coat layer, (e) an optional back coat on the print layer, (e) a pressure-sensitive adhesive, and (f) a second carrier sheet adhered to the pressure-sensitive adhesive. When used on a vehicle the graphic has an opaque portion, such as a metallic finish, at the topside of the vehicle and the opacity fades over the graphic to clear, thereby revealing the vehicle's color under the decorative sheet. The fading occurs across the width of the graphic. In one embodiment, the fade is gradual and reveals little stark changes in opacity. The present invention provides a decorative laminate which provides a fade from one opacity to another wherein the sheet has a combination of good durability, elongation, opacity, gloss and DOI levels and a defect-free surface.

DETAILED DESCRIPTION

Figure 1:
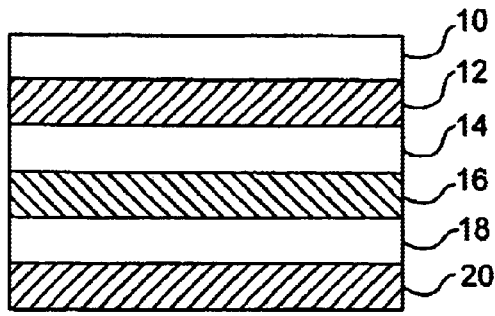
FIG. 1 is a schematic cross-sectional view illustrating one embodiment of a paint-coated composite laminate according to principles of this invention. Film thicknesses are exaggerated in size and not to scale, for simplicity.

Briefly, one embodiment of this invention provides a process for manufacturing a flexible film having a finished paint coat with exterior automotive quality durability, gloss, distinctness-of-image (DOI) and other appearance characteristics in the finished paint coat. In this process, the decorative sheet is applied to an exterior automotive panel by applying pressure to the film, which is bonded to the substrate by a pressure-sensitive adhesive. The invention is described herein in the context of a decorative sheet applied to the surface of car body member or panel, but the invention is also applicable to other articles of manufacture having a decorative sheet with properties similar to those required for exterior automotive use.

Considering the application of the invention to a process for applying the film to an exterior car body panel, a clear coat comprising a synthetic resinous material is coated in thin-film form onto a flexible, heat-resistant temporary casting sheet. The clear coat is dried on the casting sheets sufficiently to transfer a predetermined exterior surface smoothness from the casting sheet to the clear coat. A tie coat is placed on the clear coat and a fade print is placed on the tie coat. The clear coat provides the durability, gloss, DOI and other appearance properties necessary for exterior automotive use. The tie coat inhibits interlayer delamination between the clear coat and printed fade. A pressure-sensitive adhesive is formed on a casting sheet in a separate coating and drying operation. The adhesive layer is then transfer-laminated to the fade print coat of the decorative sheet. In one embodiment, a back coat is applied with tie coats to the fade print coat prior to the transfer lamination of the adhesive layer. During the laminating process, the composite decorative sheet retains the durability, gloss, DOI and other appearance properties necessary for exterior automotive applications. The finished composite adhesive-backed decorative sheet is capable of elongating sufficiently to conform to three-dimensionally contoured substrate panels without significant loss of exterior automotive appearance and durability properties, including weatherability.

The clear coat may be a film of a halogenated polymer or a polyester. The halogenated films include fluorinated and chlorinated films such as polyvinyl chloride and polyvinylidene fluoride films. In one embodiment, the clear coat portion of the decorative sheet comprises a blended fluorinated polymer and acrylic resin-containing paint system with thermoplastic properties. The relative amounts of the fluorinated polymer and acrylic resin components in the paint coat formulation provide a sufficient level of elongation for the film to be applied to complex three-dimensional shapes, in combination with a properly selected back coat, while providing sufficient durability and appearance properties for the finished film to be useful on an exterior car body panel.

In one form of the invention, the fluorinated polymer component comprises polyvinylidene fluoride (PVDF), and the acrylic resin component can be a $C_{1-12}$ or $C_{1-4}$ acrylic or methacrylic acid ester resin, such as a polymethyl methacrylate resin, a polyethyl methacrylate resin, or mixtures thereof, including copolymers thereof. One finished product having a surface capable of exterior automotive use is made from a paint system comprising from about 50% to about 75% PVDF and from about 25% to about 50% acrylic resin, by weight of the total PVDF and acrylic solids. Certain PVDF-acrylic clear coat formulations have good exterior appearance and durability properties, but room temperature elongation may not be at levels sufficient for the end-use of adhering smoothly to contoured surfaces. In one embodiment, it has been discovered that certain back coat formulations can enhance elongation of the overall composite paint film, including enhancing elongation of the PVDF-acrylic outer clear coat. One such back coat includes a chlorinated polymer-containing resin, such as polyvinyl chloride (PVC), which enhances elongation of the finished composite laminate without significant degradation of exterior automotive durability and appearance properties. In other cases, the elongation-enhancing back coat can comprise a thermoplastic fluorinated polymer and acrylic resin polyurethane. Pigmented dispersions contained in the back coat also in some instances inhibit plasticizer migration which prevents intercoat adhesion failure. Use of certain plasticizers also inhibits plasticizer migration during use, which can inhibit volatile haze problems as well as preventing interlayer adhesion failure.

In one embodiment, the clear coat is a PVC or polyester film. The PVC films may be any of those described herein. In one embodiment, the clear coats, especially those derived from PVC or polyester films include a polyurethane cover coat. The polyurethane cover coat generally has a thickness of about 0.5 to about 1.5, or from about 0.7 to about 1.1 mils. The polyurethane is typically a two component polyurethane and is applied by screen printing.

Thus, the present invention provides a process and articles of manufacture in which a decorative sheet ultimately forms an exterior finish on a contoured surface of an exterior car body panel, although the paint coat also is applicable to flat surfaces. During application to a contoured surface, the decorative sheet has sufficient elongation to retain the durability and appearance properties to be useful as a finished exterior paint coat for a car body panel.

Figure 2:
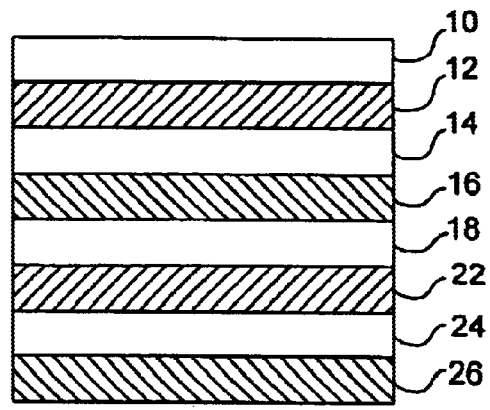
FIGS. 2-3 are further schematic cross-sectional views illustrating various embodiments of the paint-coated laminate.
Figure 3:
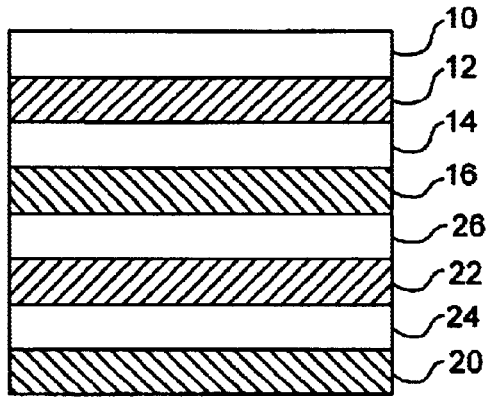

A decorative sheet with a surface capable of exterior automotive use is applied to a painted automobile sheet metal by the processing steps described below. FIGS. 1–3 illustrate various embodiments of a dry paint transfer laminate used in the process of applying a finished exterior automotive decorative sheet to the substrate panel. FIG. 1 illustrates one embodiment of the invention which includes, in combination, a flexible, foldable, heat-resistant, self-supporting first carrier sheet 10, also referred to in the art as a casting sheet, and a transferable, adherent, flexible composite clear coat coated onto one surface of the first carrier sheet. The decorative sheet is a self-supporting, flexible synthetic resinous. The decorative sheet can be formed in many embodiments described in FIGS. 1 through 3; but referring initially to the embodiment of FIG. 1, the composite decorative sheet includes a clear coat 12 coated on the carrier sheet. 10 and dried; a tie coat 14 coated on the dried clear coat; and a print coat 16 coated on the dried tie coat, in which the intervening tie coat provides a means of bonding the print coat and the clear coat. A layer of pressure-sensitive adhesive 18 is adhered to the side of the print coat opposite from the clear coat; and a second flexible, foldable, heat-resistant, self-supporting carrier sheet 20 supports the adhesive layer 18. In one embodiment, the adhesive layer 18 is separately coated on the second carrier sheet 20 and dried, followed by laminating the adhesive 18 to the print coat 16. The outer carrier sheets 10 and 20 provide exterior protection for the composite paint coat and its adhesive layer in a manner similar to a removable backing sheet. The second carrier sheet 20 is silicone coated to provide release properties for the adhesive layer 18.

Carrier Sheet

The carrier sheet 10 comprises a polyester casting film having a high gloss surface. The carrier can be a polyester film such as Mylar (a trademark of Du Pont), American Hoechst 3000 grade polyester film, SH-81 polyester film available from SKC Corporation, or the like. The carrier sheet may also be a paper liner. The DOI of the article made using the paper liner may be reduced. The preferred film thickness of the carrier sheet is about 2–3 mils. Polyester films are preferred because the high gloss surface is capable of transferring a high gloss level to a surface of the clear coat 12 in contact with the carrier, where the transferred smoothness is sufficient for exterior automotive use. The polyester carrier film has a sufficiently high heat resistance to resist axial elongation under temperatures applied during subsequent paint coat drying steps. The clear coat may be applied to the polyester carrier film without a release coat on the high gloss surface of the carrier. The formulation of the clear coat is such that the clear coat can be easily transferred from the carrier sheet and can replicate the highly smooth surface of the carrier after the clear coat dries and after subsequent dry paint transfer steps in which the paint coat is released from the carrier, as described below. The carrier sheet 20 also comprises a polyester film similar to the polyester carrier sheet 10 except for the silicone coated release surface for the adhesive layer. The polyester carrier sheets 10 and 20 serve as removable protective outer backing sheets in the combination shown in FIG. 1. The polyester carrier sheets are critical for high distinctness-of-image (DOI) applications because they impart high DOI to the finished composite sheet. The clear coat cast on the carrier sheet 10 has a smooth surface from replicating the surface of the carrier. The adhesive coat also has a smooth surface when cast on a polyester carrier. These factors enhance DOI.

Clear Coat

Figure 4:
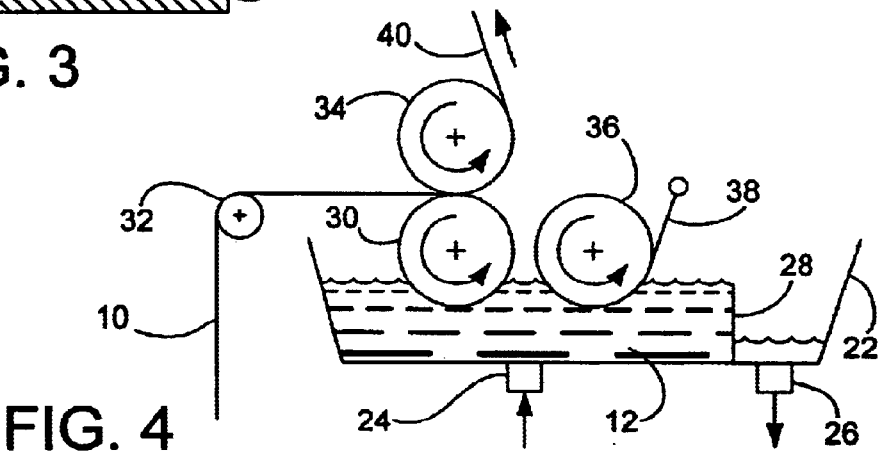
FIG. 4 is a schematic cross-sectional view illustrating a paint-coating step in the process of forming the paint-coated laminates of this invention.
Figure 5:
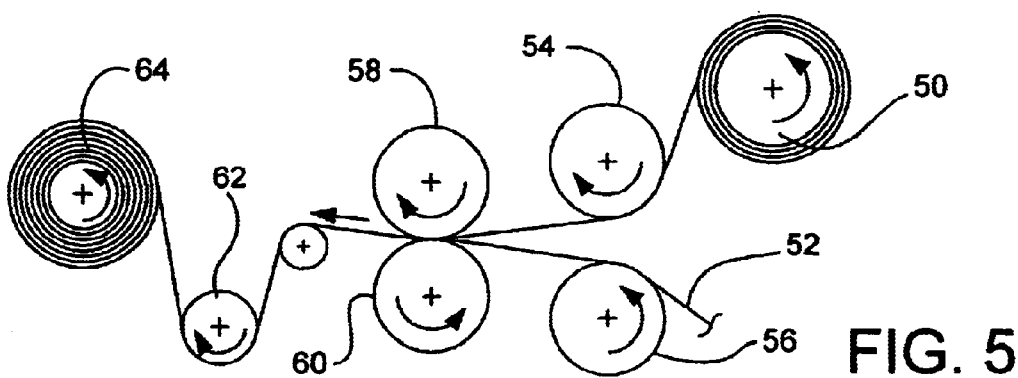
FIG. 5 is a schematic elevational view illustrating a laminating step in the process of this invention.

The clear coat is a transparent or substantially transparent thermoplastic synthetic resinous coating composition coated in thin film form onto the surface of the carrier sheet in a liquid state. Heat is later applied to the clear coat to dry it, without cross-linking the resin, while the clear coat is on the carrier. The preferred dry film thickness of the clear coat is about 0.8 mil. to 1.4, or about 0.9 to about 1.2, or about I to about 1.1 mils. Here and elsewhere in the specification and claims, the range and ratio limits may be combined. The clear coat is coated onto the first carrier sheet 10 by a reverse roll coating process illustrated in FIG. 4, although the clear coat can be applied by other methods such as a slot die coater, rather than conventional coating or casting techniques. Referring to the reverse roll coating process of FIG. 4, the clear coat lacquer is contained in a coating pan 22 having a lacquer inlet 24 in the main portion of the pan, and a lacquer drain 26 on an opposite side of a weir 28. An applicator roll 30 rotates to pick up the lacquer from the pan and coat it onto a previously uncoated polyester film 10 which passes over a guide roll 32 and then passes between the applicator roll and a rubber back-up roll 34. A metering roll 36 adjacent the applicator roll 30 rotates in the same direction as the applicator roll. A doctor blade 38 wipes the surface of the metering roll to properly control the thickness of the coating on the applicator roll. The adjustable gap between the metering roll and the applicator roll controls the thickness of the coating on the surface of the applicator roll. The coating picked up by the applicator roll is then coated onto the polyester film 10 as the film passes into contact with the reverse-rotating applicator roll. The applied coating on the film is shown at 40. The coated film then passes to a drying oven.

The clear coat is dried at oven temperatures in the range from about 200° or 250° F. to about 400° F. Preferably, the clear coat is dried in multiple zones spaced apart along the long axis of the paint-coated carrier in line with the reverse roll coater or slot die coater. A preferred drying technique involves use of three heating zones with a progressively higher temperature applied in each successive zone. The solvent contained in the clear coat is essentially all driven off in the multistage drying process. The same multistage drying process is used for drying the tie coat 14, the print coat 16 and other coatings used in the various embodiments described below. The polyester carrier is resistant to heat at temperatures up to about 400° F. so that the carrier does not deform dimensionally during the drying step. The polyester carrier film thickness of about 2–3 mils assists the film in resisting elongation during drying. This ensures a high gloss level being replicated by the surface of the dried clear coat from the high gloss surface of the carrier.

The clear coat formulation produces a dry film-form exterior film which, in combination with the underlying print coat and, optional back coat discussed below produces a composite paint coat having properties useful as an exterior automotive paint coat. The properties of such an exterior automotive paint coat or decorative sheet are described in PCT Publication WO 88107416 generally from pages 20 through 23 of that publication. The disclosure of the entire PCT publication, Application PCT/US88/00991, dated Mar. 25, 1988, is incorporated herein by this reference.

The clear coat formulation produces a dry film-form exterior film which, in combination with the underlying print coat, produces a decorative sheet having properties useful as an exterior automotive paint coat. Such a decorative sheet is principally characterized by a combination of exterior automotive durability properties and gloss and other appearance properties of the finished decorative sheet. The specifications for a decorative sheet for exterior automotive use, as defined herein, include the mechanical properties of hardness; abrasion resistance; thermal stability, including heat resistance; resistance to gasoline and acids; cleanability; adhesion; certain weatherability properties such as UV resistance and resistance to water and humidity exposure; and impact strength for simplicity, these properties are referred to collectively herein as "durability properties."

Weatherability, which is measured, in part, by UV resistance properties, is a durability property commonly used in the art to define standards for an exterior automotive paint coat. To measure UV resistance can require long-term exposure testing of the paint coat, for a period of two years in one test method. Products of the present invention have completed three year UV testing in Florida and Arizona and several thousand hours of Xenon testing.

In addition to durability properties, the specifications for an exterior automotive quality decorative sheet also include tests to measure the visual appearance qualities of the finished surface. These criteria include gloss, distinctiveness-of-image (DOI), dry film thickness and hiding ability or opacity of the paint coat. These properties are referred to collectively herein as "gloss and other appearance properties."

Thus, a decorative sheet can have a combination of pre-determined physical properties that collectively define whether the decorative sheet is capable of use as an exterior automotive paint finish. Generally, the decorative sheet of this invention, in dry film-form, provides a combination of the above-described durability and appearance properties, including gloss, which enables the paint coat to function as an exterior automotive decorative sheet.

The criteria used to define whether a decorative sheet is sufficient for exterior automotive use are not uniform throughout the automobile industry. Certain standards can vary from one auto manufacturer to the next, and from one car model to the next for a given auto manufacturer. Most criteria used to define an exterior automotive quality surface for the process of this invention have been adopted from specifications and test methods used in certain General Motors specifications. These criteria are disclosed herein as an example of techniques that can be used to measure whether a decorative sheet has sufficient properties for exterior automotive use, although other combinations of test criteria and test methods can also be used for this purpose. The specifications and test methods for measuring the properties of the exterior automotive decorative sheet of this invention are described in detail below.

In one embodiment, the clear coat 12 comprises a blend of a thermoplastic fluorinated polymer and an acrylic resin. The clear coat preferably contains the fluorinated polymer and acrylic resin as its principal components. The fluorinated polymer component is preferably a thermoplastic fluorocarbon such as polyvinylidene fluoride (PVDF). The fluorinated polymer also can include copolymers and terpolymers of vinylidene fluoride. The thermoplastic fluorocarbon useful in the clear coat is the polyvinylidene fluoride known as Kynar, a trademark of Elf Atochem Corp. This polymer is a high molecular weight (Mw=400,000) polymer which provides a useful blend of durability and chemical resistance properties. Generally, a high molecular weight PVDF resin, with a weight average molecular weight of about 200,000 to about 600,000 or about 300,000 to about 500,000 is used.

The acrylic resin component of the clear coat can be a $C_{1-12}$ or $C_{1-4}$ acrylic or methacrylic acid ester resin, such as a polymethyl methacrylate, or a polyethyl methacrylate resin, or mixtures thereof, including methacrylate copolymer resins, acrylate resins, and minor amounts of other comonomers. The clear coat also can include minor amounts of block copolymers and/or compatibilizers to stabilize the blended PVDF and acrylic resin system and provide compatibility between films.

In one embodiment, a principal component of the acrylic resin contained in the clear coat is a medium molecular weight polymethyl methacrylate resin such as Elvacite 2010, a trademark of Du Pont. (In all further references to Elvacite resins herein, it should be noted that Elvacite is a trademark of Du Pont for a group of its acrylic resins.) In another embodiment, a principal component of the acrylic resin for the clear coat can be a high molecular weight polyethyl methacrylate resin such as Elvacite 2042. The acrylic component of the clear coat also can comprise a mixture of Elvacite 2010 and a medium-to-high molecular weight polymethyl methacrylate resin such as Elvacite 2021. In a further embodiment, the acrylic resin component can comprise Elvacite 2042 and a low molecular weight polyethyl methacrylate resin such as Elvacite 2043. Other similar combinations of acrylic resins, their homopolymers and copolymers, may be used as a component of the clear coat. Generally, the acrylic resin component has a relatively high weight average molecular weight of about 50,000 to about 400,000.

The PVDF and acrylic-based clear coat formulation can be prepared as a solution of PVDF and acrylic resin in solvent. The PVDF and acrylic-based clear coat formulation also can be prepared as a dispersion of the PVDF in a solution of the acrylic resin. In one embodiment, the clear coat formulation can be prepared by mixing the acrylic resin with a suitable organic solvent and applying heat to dissolve the resin. The mixture is then allowed to cool sufficiently before adding the PVDF component so that the PVDF will not dissolve, but will be maintained as a dispersion in the acrylic-solvent based mixture. By maintaining the PVDF component as a dispersion in the clear coat, solvent evaporation during drying of the clear coat can be improved.

A preferred composition of the dried clear coat comprises from about 40% to about 85%, or from about 50% to about 75% PVDF, and from about 15% to about 60%, or from about 25% to about 50% acrylic resin, by weight. In some instances, the maximum content of the PVDF component is about 72%, with the balance essentially comprising the acrylic resin. These solids ranges are based on the relative proportions of the PVDF and acrylic components only in the clear coat formulation. Other minor amounts of solids, such as UV stabilizers, block copolymers and compatibilizers also may be contained in the clear coat formulation.

The acrylic resin component of the clear coat is desirable because of its compatibility with the PVDF in dry film form. The acrylic resin is also added in an amount that yields a transparent clear coat in dry film form. Generally speaking, transparency and DOI of the composite paint coat increase in proportion to the amount of acrylic resin added to the PVDF-acrylic system. It has been determined that a pure PVDF clear coat has reasonably good properties of durability and elongation, but such a 100% PVDF coating is not normally transparent. When sufficient acrylic resin is added to the PVDF component, the resulting clear coat becomes reasonably transparent. Increased transparency of the clear coat improves the gloss level of the finished clear coat. The acrylic resin is also combined with the PVDF in an amount that maintains sufficient elongation to allow the clear coat (and the tie layer to which it is bonded) to be applied (as part of the construction described below) to complex three-dimensional shapes, while retaining the exterior automotive durability properties and appearance properties, including gloss and DOI, of the finished paint coat. It has been determined that a dry film-form PVDF-acrylic-based clear coat containing about 28–35% acrylic resin and about 65% to 72% PVDF, by weight of the total PVDF and acrylic solids, will yield sufficient elongation.

Tie Coat

An acrylic-based tie coat 14 bonds the print coat 16 to the clear coat 12. The tie coat is applied by coating it directly to the clear coat by a reverse roll coat or gravure printing process. The tie coat may also be applied by a slot die. The preferred film thickness of the tie coat is 0.05 to about 0.5, or about 0.1 to 0.4, or about 0.2 to about 0.4 mi. The tie coat is essentially transparent so that the print coat 16 is visible through the clear coat 12 and the underlying tie coat 14. The tie coat provides a critical function of enhancing interlayer bonding between the clear coat 12 and the print coat 16, where the clear coat and print coat are comprised of different polymers. The tie coat layer may be prepared by any polymer which is useful in binding or in improving the adhesion of the print coat to the clear coat. A preferred polymer is an acrylic based tie coat such as a polyacrylate or polymethacrylate base tie coat. Examples of useful acrylates include $C_{1-12}$, or $C_{1-6}$ alkyl polyacrylates and polymethacrylates. Specific examples include polymethylmethacrylate, polyethylmethacrylate, etc. The tie coat formulation also is described in the examples to follow.

Print Coat

The print coat 16 is preferably applied by any printing means such as gravure printing or lithographic printing. The print coat generally has a thickness of about 0.05 to about 0.8, or from about 0.1 to about 0.5, or about 0.15 to about 0.3 mil. The print coat is applied preferably by gravure printing. The print coat has a varied degree of opacity over the width of the decorative sheet. In other words, the print coat fades across the width of the decorative sheet. The decorative sheet may be any width such as from about 2 inches to about 36 inches or about 4 inches to about 24 inches, or about 6 inches to about 20 inches.

The print coat, as described above, fades across the decorative sheet. In one embodiment, the print coat has a color density reduction of less than about 80% in the first half of the decorative sheet. The color density reduction is preferably less than about 75% or about 70% of the original color density. Color density is determined by a color densitometer as is known in the art. The color density change in the second half of the decorative sheet is from about 70% to about 100%, or from about 75% to about 97%, or from about 80% to about 90% of the original color density.

In another embodiment, the fade print has a gradual change in color density to provide a consistent smooth transition of color from the decorative sheet to the color of the substrate, such as an automobile. The change in color density is preferably from about 5% to about 20%, or from about 8% to about 18% per inch over three quarters of the decorative sheet.

The print coat is composed of pigments and a polymeric carrier. The polymeric carrier may be any of those useful which are compatible in preparing a print coat which does not delaminate. The polymeric carrier may be any of the polymers disclosed for the layers of the decorative sheet. Preferably, the polymeric carrier is a acrylic or polyvinyl fluoride polymer. In a preferred embodiment, the polymeric carrier has the same composition as the clear coat, described above. The polymeric carrier is generally present in an amount from about 50% up to about 97%, or from about 75% to about 95%, or from about 80% to about 95% by weight. The print coat is also composed of a pigment. The pigment may be any of those useful in automotive applications. In a preferred embodiment, the pigment is a metallic pigment such as an aluminum flake. The pigment is generally present in an amount from about 1% up to about 30%, or from about 2% up to about 20%, or from about 5% up to about 15% by weight. The print coat is applied by a printing process and is diluted with thinner to provide the necessary viscosity for the printing process used. The thinner may be an organic solvent such as a ketone, alcohol, etc.

Pressure-Sensitive Adhesive Coat

Referring again to FIG. 1, the adhesive layer 18 is next laminated to the dried print coat. The adhesive layer is coated on the second carrier sheet 20 and dried on the carrier before laminating the dried adhesive coat to the print coat. The adhesive coat is dried in ovens similar to those used to dry the clear coat and print coat, but at much lower temperatures, e.g., about 180° F. The adhesive coat bonds the decorative sheet to the exterior automotive substrate in the application step described below. The adhesive coat preferably comprises an acrylic-based synthetic resinous material which is activated from pressure applied during the subsequent application step to bond the decorative sheet to the exterior automotive substrate. The preferred dry film thickness of the adhesive coat is from about 0.5 to about 3 or from about 0.75 to about 2.0, or from about 1 to about 1.5 mils.

The pressure-sensitive adhesive is preferably cast on a smooth surfaced polyester casting sheet in a separate operation. The adhesive coat is dried to produce a smooth surface. The adhesive coat is then laminated to the print coat or back coat side to provide the adhesive backing. Any surface roughness of the adhesive coat can be reflected through the top coat of the finished paint coated laminate, thereby reducing DOI of the finished product. Casting the adhesive in a separate step on a smooth polyester carrier produces a sufficiently smooth surface that DOI of the finished product is not significantly affected when laminating the pressure-sensitive adhesive to the paint coated laminated. The adhesive coat is not cast directly on the dried PVC coat to avoid the adhesive solvents from attacking the PVC coat.

In the embodiment illustrated in FIG. 2, decorative sheet has a carrier 10 on clear coat 12 which has tie coat 14 as is described above. On the tie coats is a fade print layer 16. A backing layer 22 is also present in this decorative sheet and is on the other side of the fade print layer. The backing layer may, in one embodiment, be pigmented or colored. The backing layer 22 is connected to the fade print layer 16 by means of a pressure-sensitive adhesive 18, which has been described above. The decorative sheet also contains carrier film 20 bonded to back coat 22 through pressure-sensitive adhesive 24. The back coat 22 provides the function of enhancing elongation of the finished laminate. To achieve this function, the back coat contains a thermoplastic chlorinated polymer, preferably polyvinyl chloride (PVC). Such a PVC-containing back coat has been found useful as a means of improving room temperature elongation of the finished decorative coated sheet. In particular, it enhances elongation when used in combination with the PVDF-acrylic outer clear coat. On the other hand, use of a PVC-containing polymer for an exterior automotive composite paint coat can have UV and heat resistance problems. To avoid these problems, the PVC-containing back coat is not used as an exterior coat, but rather an underlying film bonded to the overlying PVDF-acrylic coat or coats. The flexibility-enhancing formulation of the back coat 22 can be prepared by mixing the chlorinated component, along with various additives, such as plasticizers and heat and light stabilizers, in suitable organic solvents. The preferred chlorinated polymer component for the back coat is a polyvinyl chloride homopolymer resin such as Geon 199, a trademark of B. F. Goodrich Chemical Co. The resin component can include a minor percentage of an acrylic component. Suitable organic solvents include a non-polar solvent comprising an aromatic petroleum distillate such as Hi-Sol 10, a trademark of Ashland Chemical Co.

The plasticizers contained in the thermoplastic chlorinated polymer formulation enhance elongation and flexibility properties of the back coat. The plasticizers are generally present in an amount from about 15 to about 45, or from about 20 to about 40, or from about 25 to about 30 phr (parts per 100 parts of back coat resin). The particular plasticizers used in the formulation are those that avoid significant migration during use. Such plasticizer migration can cause interlayer delamination and volatile haze problems in the finished product. Use of certain high molecular weight plasticizers have been found to inhibit plasticizer migration. Plasticizers with a molecular weight greater than about 7,000 can produce good plasticizer permanence. In one embodiment, a plasticizer comprising polyester azelates (propylene glycol azelaic acids) having a molecular weight of 7,080 produced good migration resistance and good resistance to volatile haze and interlayer delamination problems, as demonstrated in the examples to follow.

Thus, the desired back coat formulation provides the appearance and durability properties which, in combination with the clear coat, produce a decorative sheet having the properties suitable for exterior automotive use. These include high gloss, DOI and weatherability. The back coat enhances elongation of the combined clear coat and print coat while durability and appearance properties, including gloss and DOI, of the finished decorative sheet are not degraded. During use, the decorative sheet can be subjected to elongation in order to conform to three-dimensionally contoured surfaces. Such elongation of the finished laminate can be achieved without disruption of the necessary exterior automotive properties even under extremes of heat, cold and humidity.

As an alternative to the PVC component, the back coat also can contain other resin formulations. A flexible acrylic or urethane resin with good room temperature elongation properties also may be useful as a back coat formulation. In addition, the PVC-containing back coat may be used in combination with one or more different resin formulations, such as a blended fluorinated polymer and acrylic resin. The chlorinated polymer back coat enhances flexibility of the finished decorative sheet.

In another embodiment, the decorative sheet is represented by FIG. 3. The decorative sheet of FIG. 3 has carrier 10, top coat 12, tie coat 14 and fade print layer 16 as described above. On fade print layer 16 is a printed tie layer 26 which improves adhesion of the fade print layer to back coat 22. The tie coat has a thickness of about 0.05 to about 0.5, or about 0.1 to about 3, or about 0.2 mil. Back coat 22 is described above. Tie layer 26 is an acrylic based tie layer that improves the adhesion of back coat 22 to the faded print layer 16. The tie layers include those described above. Back coat 22 is also attached to carrier 20 through pressure-sensitive adhesive 24. Those components have been described above.

Printing

As described above, print layer 16 is applied by any suitable printing means, such as gravure or lithographic printing.

In a preferred embodiment, the fade print coat is printed by gravure printing and the gravure cylinder selected to provide a smooth fade of the ink across the decorative sheet. The process for printing is generally as follows, a multistage gravure coater having two cylinders prints directly on the tie coat layer. The first cylinder has 125 cells per inch, while the second cylinder has a 150 cells per inch. At each gravure printing station, the print is air dried to at about 200 to 270, or from about 230 to about 260, or about 240° F. The drying occurs in an oven length of approximately 10 to 30, or from about 20 feet. The ink is passed through ;the oven at a rate sufficient to dry each print before the next one is applied. The line speed of the gravure printing is about 80 to 200 feet per minute.

The fade is accomplished by varying the amount of ink applied by having the cell volume of the gravure cell change over the distance of the cylinder. This change in volume effects the amount of ink printed and therefore leads to a fade pattern.

The print coat composition is preferably a synthetic resinous coating composition having thermoplastic properties similar to the clear coat. Although the print coat alone does not necessarily require all of the exterior automotive properties of durability and appearance, in order to produce a useful composite paint coat, a color coat composition (exclusive of the pigment contained in the coating) having most of the desirable exterior automotive durability properties is preferred.

Application Procedures

For vehicle preparation, all areas of the car body panel are thoroughly washed to remove all factory applied protective coatings. Surfaces must be smooth and free from paint defects such as pits, paint nibs, dirt, sags, and rough two-tone paint break lines. These defects are removed by sanding, and using 360 or 400 grit wet or dry sandpaper. Such defects can telescope through the film if not removed.

The cleaning procedure involves using a clean, lint-free cloth to wipe the areas with naphtha cleaner. Next, a second clean, lint-free cloth, is used to wipe the areas with isopropanol. Then, using a third clean, lint-free cloth, the entire area is dry-wiped. The film should be applied as soon as reasonably possible after the dry-wipe step to avoid additional contamination.

Temperature effects can have a profound effect on application properties. Film application is most easily made when air, film and body surface temperatures are between 21° C. and 32° C. For applications below 21° C., heat lamps or other suitable means are used to warm the body surface and film. The body surface must be allowed to cool if above 32° C. The film should not be applied when the film and surfaces temperature are below 15° C.

Tools and equipment include plastic squeegee (both with and without a felt oversleeve), spray bottle, air release tool or pin, razor blades, heat gun, clean, lint-free cloths, heaters, naphtha, isopropanol, detergent or surfactant, and 360 and 400 grit wet/dry sandpaper.

Since contamination can be visible in the film application, the working area should be draft free and free from dust or dirt. Lighting should be bright enough to clearly reveal all vehicle contour lines without shadowing, especially in the lower body area. Heat lamps should be available when lower temperatures are expected.

The first step in the application procedure is removal of the polyester carrier or liner 20 covering the adhesive layer 18. During the liner removal step, the film is placed on a clean, flat surface with the liner side up. The liner is removed in a smooth, 180 degree motion. It is mandatory to remove the liner from the film, and not vice versa, since removing the film from the liner can cause film stretching.

After the liner has been removed, the adhesive side of the film and the car body surface are moistened with a solution of 2.5 ml of detergent or surfactant per liter of deionized water. More detergent or surfactant may be added if temperature and humidity are high. Wetting the surface in this manner temporarily lowers the aggressiveness of the adhesive, which facilitates positioning of the film and later removal of any air bubbles or wrinkles. The film is next aligned to the proper location on the car body panel. Starting in the center and working outward, a squeegee is used to pressurize the film to the surface with firm, overlapping strokes, making sure accurate alignment is maintained. Squeegeeing is repeated until all water and air are removed from beneath the film and proper edge bonding is ensured.

The first carrier sheet 10 has been replaced by a pre-mask which is removed by pulling it back over itself in a smooth, steady motion at a 180 degree angle. (In some instances the first carrier sheet can be left in place in which case the pre-mask is not used). The applied film is inspected for air bubbles which are pierced with an air release tool or pin. The squeegee is used to force air and water out through the pierced hole. If trimming the film is necessary, a sharp razor blade with a back-up template are used to prevent damage to any painted areas. The entire surface of the film is examined for manufacturing flaws, wrinkles, or misalignment. The entire surface of the film is resqueegeed, using the squeegee with a felt oversleeve, to ensure that all edges have received adequate pressure to prevent tape peeling.

In the following examples and elsewherein the specification and claims, unless otherwise indicated the weights and ratios are by weight, the pressure is atmospheric pressure and the temperature is in degrees Celsius.

EXAMPLE 1

The following example relates to decorative sheets of the present invention. A clear coat formulation is prepared by dissolving 11 parts of polyethylmethacrylate (Elvacite 2042), 21 parts of polyvinylidene fluoride (Kynar 301F), and 0.64 parts of stabilizer UV (Tinuvin 900 available from Ceba-Geigy Corporation) 20 parts of Exxate 700, 20 parts of cyclohexanone, and 20 parts of butyrolactone with high speed agitation. The mixture is maintained below 130° C. and then cooled. The viscosity of the mixture is adjusted to 1000 centipoise using thinner of equal parts of Exxate 700, cyclohexanone and butyrolactone. This formulation is coated onto a 2 mil thick high gloss polyester film (SH-81 of SKC Corporation) polyester film to a thickness of about 1.0 mil.

The clear coat is dried on the carrier sheet by passing it through a multi-zone impinging air drying oven having three heating zones spaced apart axially along the length of the carrier, with each drying zone having a progressively higher temperature. The clear-coated carrier is passed through the heating zones at a line speed of 25 feet per minute and each heating zone was 40 feet long. Temperatures of the three heating zones are: Zone 1: 240° F., Zone 2: 300° F., Zone 3: 350° F. Passing the clear coat through the three heating zones removes substantially all solvent gases from the clear coat to produce a dry clear coat of uniform film thickness. The dried clear coat comprises approximately 65% PVDF and approximately 35% acrylic resin, by weight of the total PVDF and acrylic solids.

A tie coat formulation is prepared by dissolving 20 parts Elvacite 2042 (polyethylmethacrylate) and 0.3 parts of Tinuvin 900 and 40 parts of toluene and 39.7 parts of N-propyl acetate with high speed agitation. The viscosity is adjusted to 300 centipoise using toluene as a thinner. This formulation is then coated on the clear coat to a thickness of 0.3 mil. The tie coat is passed through one oven zone at 200° F. The fade print composition is prepared by mixing 86.7 parts of an intermediate with (aluminum flake dispersed in isopropyl acetate available commercially from Avery Dennison) and 2.5 parts thinner (toluene). The intermediate is prepared by mixing 4.2 parts of Elvacite 2012 with 41.5 parts methylethyl ketone with high agitation. Kynar 7201 (12.5 parts) and Tinuvin 900 (0.3 parts) are added to the mixture with agitation. The mixture is heated to 130° F. where 41.5 parts of methylpropyl ketone is added. The fade ink composition is printed using a multi-stage gravure coater with 2 gravure cylinders in succession. The first cylinder has 125 cells per inch and the second cylinder has 150 cells per inch. The cylinder specifications are as below.

| Cylinder No. | 1 | 2 |
|---|---|---|
| Line Screen | 150 | 125 |
| Compression | 60 | 45 |
| Horizontal Diagonal Microns | 141 | 197 |
| Vertical Diagonal Microns | 144 | 175 |
| Channel Width Microns | 2 | 17 |
| Cell Depth Microns | 43.0 | 59.0 |
| Wall Width Microns | 8 | 13 |
| Cell Width Microns | 165 | 252 |
| Cell Length Microns | 319 | 288 |

The fade print and tie coat are applied in one pass using two 137 HK gravure cylinders. After printing the fade print and tie coat are dried at 240° F. The oven length is, approximately 20 feet and the line speed for printing is about 80 to 200 feet per minute. The tie coat had the same composition as the other tie coat. The tie coat thickness is about 0.2 mil.

The back coat was prepared by first mixing the 19.39 parts of Hi-Sol 10 (aromatic solvent) and 6.46 parts of 2-Ethyl hexyl acetate. Next, the 3.9 parts of UV stabilizer N-539 available from Ciba-Geigy, 3.9 parts of CaZn heat stabilizer (MK-4119), 1.9 part of hindered amine light stabilizer (Tinuvin 123), 1.93 parts of heat stabilizer, TC 909, and 17 parts plasticizer (Emery 9790) were added under low agitation. The 48.82 parts of Geon 199 was then added under high agitation and mixed until it was observed that no solid particles remained in the solution.

The back coat was coated on the dried tie coat layer to a dry film thickness of about 2.0 mils. The back coat is applied to the sheet by the same reverse roll coater that was used for the clear coat. The line speed was 25 feet per minute. Temperatures of the three heating zones were: Zone 1: 160° F., Zone 2: 270° F., Zone 3: 360° F. Passing the color coat through the three heating zones removed substantially all the solvent to produce a dry coat of uniform film thickness.

An acrylic-based pressure-sensitive adhesive, available commercially from Solutia, Inc. as 2837 adhesive, is a self-crosslinking system comprising 36% acrylic resin solids and solvent mixture comprising toluene, ethyl acetate and isopropyl alcohol. The pressure-sensitive adhesive is reverse roll coated on a separate silicone coated polyester film casting sheet. The flexible carrier comprises two mil thick ultra-smooth H. P. Smith 2094 polyester film. The adhesive is dried at a line speed of 45 feet per minute. The final dry film thickness is about 1.2 mils. A three heating zone oven was again used, with the following zone temperatures: Zone 1: 140° F., Zone 2: 180° F., Zone 3: 200° F. Passing the adhesive through these three heating zones was sufficient to remove 99% of the solvents from the adhesive.

After the dried adhesive exits the last oven zone, it is passed over a chill roll, and is then laminated to the back coat in an operation illustrated in FIG. 7. In the laminating step, the carrier 10, which includes the clear coat and print coat, is stored on a top unwind roll 50. The adhesive-coated carrier 12, in flat form, is shown at 52. The print coat sheet is passed around a drum 54, and the adhesive-coated carrier 52 is passed around a drum 56 spaced from the drum 54. The print coated carrier 10 and adhesive-coated sheet 20 then pass between a laminating drum 58 and a rubber back-up roll 60 for pressing the two sheets into contact to bond the adhesive layer to the clear PVC. Following the laminating step, the decorative sheet with the carrier sheets 10 and 20 acting as outer liners on both sides of the laminate, is then passed around a roll 62 and onto a laminate rewind drum 64.

The adhesive coated construction was then sheeted and die cut to the desired shape. The sheeting operation occurs after the laminate has been unwound from the rewind drum 64. The top polyester liner (originally used for casting of the clear coat) was stripped away and replaced by an exterior automotive application tape (commonly known as a premask), commercially available as American Biltrite X758. Before application, the bottom polyester liner (originally used for adhesive casting) was removed to expose the adhesive. The adhesive-coated side of the construction was applied to the automotive substrate. When the construction was positioned correctly, a squeegee was used to apply pressure, after which the pre-mask was removed.

EXAMPLE 2

A decorative sheet is prepared as described in Example 1, except that there is no back coat and the fade print is bonded directly to the pressure sensitive adhesive.

EXAMPLE 3

Another decorative sheet is prepared as described in example 1 except there is no back coat and the clear coat is a 2 mil PVC film is used instead the blended clear coat, and a screen printed urethane cover coat is applied to the PVC clear coat.

EXAMPLE 4

Another decorative sheet is prepared as described in example 1 except that the clear coat is a 2 mil polyester film is used instead the blended clear coat.

EXAMPLE 5

Another decorative sheet is prepared as described in Example 2, except, a polyester clear coat is used in place of the blended clear coat.

In one embodiment, the invention relates to a clear, printed automobile sheet, comprising (a) an outer heat resistant carrier first carrier sheet, (b) a clear coat comprising a blend of a fluorocarbon polymer and an acrylic or methacrylic resin coated on the carrier sheet, (c) a tie coat layer on the clear coat layer, (d) an fade print coat on the tie coat layer, (e) an optically clear chlorinated polymer layer on the print layer, (e) a pressure-sensitive adhesive adhered to the chlorinated polymer layer and (f) a second carrier sheet releasably adhered to the pressure-sensitive adhesive. The carrier sheet (a) is a heat resistant polyester. The ink layer comprises a fluorocarbon polymer, an acrylic or methacrylic resin and a pigment. The pigment may be any pigment which is printable. In one embodiment, the pigment is UV, heat and weather stable. Examples of pigments include organic or inorganic pigments and mixtures. Carbon black and aluminum flake are two examples of such pigments. In one embodiment, the exterior surface of the composite paint coat has an exterior automotive quality gloss level and a distinctness-of-image value greater than about 60. In one embodiment, the sheet has a level of elongation in the range from about 50% to about 150% the original dimension of the sheet. In one embodiment, the optically clear chlorinated polymer contains a plasticizer in an amount sufficient to inhibit volatile haze in the finished composite paint coat as measured by a less than 20% reduction of said gloss level when subjected to a temperature of 80° C. In one embodiment, the chlorinated polymer layer contains a UV absorber and a heat stabilizer. In one embodiment, the tie coat layer (c) comprises an acrylic-based resin. In one embodiment, the clear coat has a thickness greater than about 0.8 mil to 1.4 mils.

This invention also relates to a clear, printed automobile sheet, comprising (a) an outer heat resistant carrier first carrier sheet, (b) a clear coat comprising a blend of a polyvinylidene fluoride polymer and an acrylic or methacrylic resin coated on the carrier sheet and having a thickness of about 0.5 to about 2.5mils, (c) a acrylic tie coat layer on the clear coat layer, (d) an gravure printed ink layer on the tie coat layer and having a thickness of about 0.05 to about 0.8 mil, (e) an optically clear plasticized polyvinyl chloride polymer layer on the print layer, (e) a pressure-sensitive adhesive adhered to the chlorinated polymer layer and (f) a second carrier sheet releasably adhered to the pressure-sensitive adhesive. In one embodiment, the exterior surface of the composite paint coat has an exterior automotive quality gloss level and a distinctness-of-image value greater than about 60. In one embodiment, the sheet has a level of elongation in the range from about 50% to about 150% the original dimension of the sheet. In one embodiment, the optically clear chlorinated polymer contains a plasticizer in an amount sufficient to inhibit volatile haze in the finished composite paint coat as measured by a less than 20% reduction of said gloss level when subjected to a temperature of 80° C. In one embodiment, polymer layer contains a UV absorber and a heat stabilizer.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A decorative automobile sheet comprising:
   (a) a clear coat comprising a blend of a fluorocarbon polymer and an acrylic or methacrylic resin having a first and second surface,
   (b) an acrylic tie layer on the second surface of the clear coat layer,
   (c) a fade print layer on the tie coat layer,
   (d) an optically clear chlorinated polymer layer on the print layer, and
   (e) a pressure-sensitive adhesive adhered to the chlorinated polymer layer.

2. The sheet of claim 1 wherein the exterior surface of the composite paint coat has an exterior automotive quality gloss level and a distinctness-of-image value greater than about 60.

3. The sheet of claim 1 wherein sheet has a level of elongation in the range from about 50% to about 150% the original dimension of the sheet.

4. The sheet of claim 1 wherein ink layer comprises a fluorocarbon polymer, an acrylic or methacrylic resin and a pigment.

5. The sheet of claim 1 wherein optically clear chlorinated polymer contains a plasticizer in an amount sufficient to inhibit volatile haze in the finished composite paint coat as measured by a less than 20% reduction of said gloss level when subjected to a temperature of 80° C.

6. The sheet of claim 1 wherein the chlorinated polymer layer contains a UV absorber and a heat stabilizer.

7. The sheet of claim 1 wherein the tie coat layer (c) comprises an acrylic-based resin.

8. The sheet of claim 1 wherein the optically clear chlorinated polymer is connected to the print layer through a clear pressure sensitive adhesive.

9. The sheet of claim 1 further comprising carrier sheets on the first surface of the clear coat layer and releaseably adhered to the pressure sensitive adhesive.

* * * * *